(12) United States Patent
Yang et al.

(10) Patent No.: US 11,954,118 B2
(45) Date of Patent: Apr. 9, 2024

(54) METHOD, DEVICE AND COMPUTER PROGRAM PRODUCT FOR DATA BACKUP

(71) Applicant: EMC IP Holding Company LLC, Hopkinton, MA (US)

(72) Inventors: Lifeng Yang, Beijing (CN); Jian Gao, Beijing (CN); Colin Zou, San Jose, CA (US); Xinlei Xu, Beijing (CN); Changyu Feng, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 534 days.

(21) Appl. No.: 16/169,399

(22) Filed: Oct. 24, 2018

(65) Prior Publication Data
US 2019/0130011 A1    May 2, 2019

(30) Foreign Application Priority Data
Oct. 27, 2017    (CN) .......................... 201711023126.0

(51) Int. Cl.
| | |
|---|---|
| *G06F 16/27* | (2019.01) |
| *G06F 11/14* | (2006.01) |
| *G06F 16/22* | (2019.01) |
| *H04L 67/1097* | (2022.01) |

(52) U.S. Cl.
CPC .......... *G06F 16/27* (2019.01); *G06F 11/1464* (2013.01); *G06F 16/2255* (2019.01); *G06F 16/2272* (2019.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 8,402,250 | B1* | 3/2013 | Juillard | G06F 16/1824 711/216 |
| 9,436,292 | B1* | 9/2016 | Douglis | G06F 11/1453 |
| 9,521,198 | B1* | 12/2016 | Agarwala | G06F 3/061 |
| 9,723,069 | B1* | 8/2017 | Fallows | H04L 67/1036 |

(Continued)

FOREIGN PATENT DOCUMENTS

| | | |
|---|---|---|
| CN | 103098015 | 5/2013 |
| CN | 103229147 | 7/2013 |

*Primary Examiner* — Kris E Mackes
*Assistant Examiner* — Soheila (Gina) Davanlou
(74) *Attorney, Agent, or Firm* — BainwoodHuang

(57) ABSTRACT

Embodiments of the present disclosure relate to method, device and computer program product for data backup. The method comprises: in response to receiving from a backup server a data stream to be backed up, dividing the data stream into a plurality of data segments; distributing the plurality of data segments to at least one computing node; in response to receiving an index of a corresponding data segment from a first computing node of the at least one computing node, looking up the index in a global index cache, the index being generated by the first computing node to uniquely identify the data segment, the global index cache storing indexes of data in a backup storage device; in response to the missing index in the global index cache, adding the index into the global index cache; and sending to the first computing node an indication to store the data segment in the backup storage device.

15 Claims, 6 Drawing Sheets

(56) References Cited

U.S. PATENT DOCUMENTS

| | | | |
|---|---|---|---|
| 10,037,336 B1 | 7/2018 | Hu et al. | |
| 10,678,435 B2 | 6/2020 | Swift | |
| 10,891,261 B2 | 1/2021 | Zhang et al. | |
| 2004/0098390 A1* | 5/2004 | Bayliss | G06F 16/27 |
| 2007/0076590 A1* | 4/2007 | Galpin | G06F 11/2007 |
| | | | 370/216 |
| 2013/0036289 A1* | 2/2013 | Welnicki | G06F 3/0608 |
| | | | 711/173 |
| 2013/0318313 A1* | 11/2013 | Clifford | G06F 11/1461 |
| | | | 711/162 |
| 2015/0213049 A1* | 7/2015 | Kleiman | G06F 16/1752 |
| | | | 707/692 |
| 2016/0041777 A1* | 2/2016 | Tripathy | G06F 16/172 |
| | | | 711/126 |

* cited by examiner

METHOD, DEVICE AND COMPUTER PROGRAM PRODUCT FOR DATA BACKUP

RELATED APPLICATIONS

This application claim priority from Chinese Patent Application Number CN 201711023126.0, filed on Oct. 27, 2017 at the State Intellectual Property Office, China, titled "METHOD, DEVICE AND COMPUTER PROGRAM PRODUCT FOR BACKING UP DATA" the contents of which is herein incorporated by reference in its entirety.

FIELD

Embodiments of the present disclosure relate to the field of computer storage, and more specifically, to method, device and computer program product for data backup.

BACKGROUND

With the rapid development of information society, the increasingly penetrating information system has spilled over into peoples' daily life and service operations of enterprises, and the dependence on the information system is becoming stronger. Once the key data is missing or damaged, immeasurable loss may be brought to individuals and enterprises.

Data backup and recovery are important measures for the safety of information. The growing importance of data calls for effective and comprehensive protection for data on the storage system. As new technologies emerge and progress, such as high-speed network, communication technology, mass storage technology and the like, the basic storage resources have changed tremendously compared with the past. The progressively increasing applications of a variety of information systems also cause the amount of data requiring protection to grow geometrically, which puts forward a higher demand for development of data backup and recovery and related technology research. However, the conventional data backup system can hardly perform effective scale-out.

SUMMARY

Embodiments of the present disclosure provide a solution for data backup.

According to a first aspect of the present disclosure, there is provided a method of backing up data. The method comprises: in response to receiving from a backup server a data stream to be backed up, dividing the data stream into a plurality of data segments; distributing the plurality of data segments to at least one computing node; in response to receiving an index of a respective data segment from a first computing node of the at least one computing node, looking up the index in a global index cache, the index being generated by the first computing node to uniquely identify the data segment, the global index cache storing indexes of data in a backup storage device; in response to missing the index in the global index cache, adding the index into the global index cache; and sending to the first computing node an indication to store the data segment in the backup storage device.

According to a second aspect of the present disclosure, there is provided a method of backing up data. The method comprises: in response to receiving a data segment from a management node, calculating an index to uniquely identify the data segment; looking up the index in a local index cache storing indexes of data in a local backup storage device; in response to missing the index in the local index cache, sending the index to the management node; in response to receiving from the management node an indication to store the data segment, storing the data segment in the local backup storage device; and adding the index into the local index cache.

According to a third aspect of the present disclosure, there is provided a device for backing up data. The device comprises: at least one processing unit; at least one memory coupled to the at least one processing unit and storing instructions executed by the at least one processing unit, the instructions, when executed by the at least one processing unit, causing the device to perform actions consisting of: in response to receiving from a backup server a data stream to be backed up, dividing the data stream into a plurality of data segments; distributing the plurality of data segments to at least one computing node; in response to receiving an index of a respective data segment from a first computing node of the at least one computing node, looking up the index in a global index cache, the index being generated by the first computing node to uniquely identify the data segment, the global index cache storing indexes of data in a backup storage device; in response to missing the index in the global index cache, adding the index into the global index cache; and sending to the first computing node an indication to store the data segment in the backup storage device.

According to a fourth aspect of the present disclosure, there is provided a device for backing up data. The device comprises: at least one processing unit; at least one memory coupled to the at least one processing unit and storing instructions executed by the at least one processing unit, the instructions, when executed by the at least one processing unit, causing the device to perform actions consisting of: in response to receiving a data segment from a management node, calculating an index to uniquely identify the data segment; looking up the index in a local index cache storing indexes of data in a local backup storage device; in response to missing the index in the local index cache, sending the index to the management node; in response to receiving from the management node an indication to store the data segment, storing the data segment in the local backup storage device; and adding the index into the local index cache According to a fifth aspect of the present disclosure, there is provided a computer program product. The computer program product is stored in a non-transient computer storage medium and comprises machine executable instructions which, when executed by a device, cause the device to perform the method according to the first aspect and the second aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the identical reference sign usually refers to the identical component in the example embodiments of the present disclosure.

DETAILED DESCRIPTION OF EMBODIMENTS

Preferred embodiments of the present disclosure will be described in more detail with reference to the drawings. Although the drawings illustrate preferred embodiments of the present disclosure, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one further embodiment." The term "first," "second" or the like can represent different or the same objects. Other definitions, either explicit or implicit, may be included below.

Figure 1:
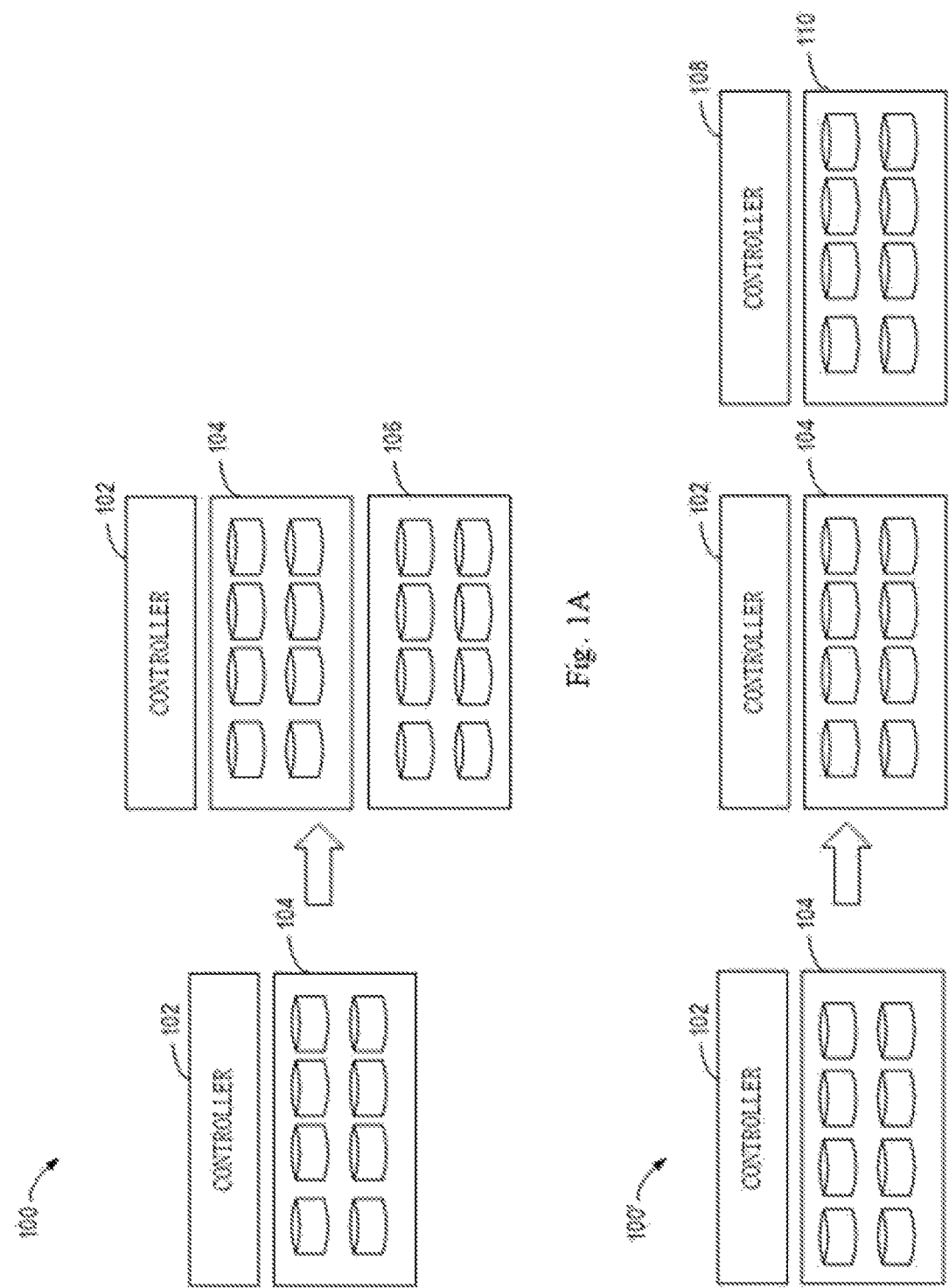
FIGS. 1A-1B illustrate a schematic diagram of comparison between scale-up and scale-out.

As the scale of backup data increases, users need to scale the backup system to satisfy the increasing backup requirements. Therefore, scalability of the backup system is becoming increasingly important. There are two scaling methods for the backup system: scale-out and scale-up. FIGS. 1A-1B illustrate a schematic diagram of comparison between scale-up and scale-out.

FIG. 1A illustrates a schematic diagram 100 of scale-up. As shown in FIG. 1A, controllers 102 for all processing does not increase but only new storage resources 106 are scaled on the basis of the existing storage resources 104 in the scale-up. In this scaling solution, scalability of the system is limited by the performance of a single controller 102. Meanwhile, as effective multi-task management tools are absent in the architecture, workloads might be affected when the controller 104 manages different workloads. Besides, once the controller 104 breaks down, operations of all services managed by the controller 104 will be affected for this architecture. However, various service requirements of the users are constantly growing with the technology development, which will greatly increase storage costs of the users.

FIG. 1B illustrates a schematic diagram 100' of scale-out. As shown in FIG. 1B, the scale-out not only adds new storage resources 110, but also incorporates a controller 108 coordinating with the storage resources 110, so as to construct a new storage node. This scaling solution will no longer be limited by the processing resources, and usually can be scaled to a larger amount of storage nodes under one management node. Additionally, each node may be independently managed in the scaling solution, such as system upgrade, hardware replacement and storage resource expansion etc.

The inventor realizes that that the scale-out mechanism is more suitable for scaling of the data backup system than the scale-up mechanism. Embodiments of the present disclosure provide a data backup architecture for scale-out, and a data backup method based on the architecture. In this solution, a scale-out data backup system is established based on ZooKeeper and Ceph, and a double deduplication mechanism is provided based on the system. The deduplication task may be evenly distributed to a plurality of computing nodes based on the mechanism to alleviate workload of the management node; meanwhile, a secondary deduplication at the management node may effectively ensure that the data is not repeatedly stored, thereby saving the storage space in the backup storage device.

Figure 2:
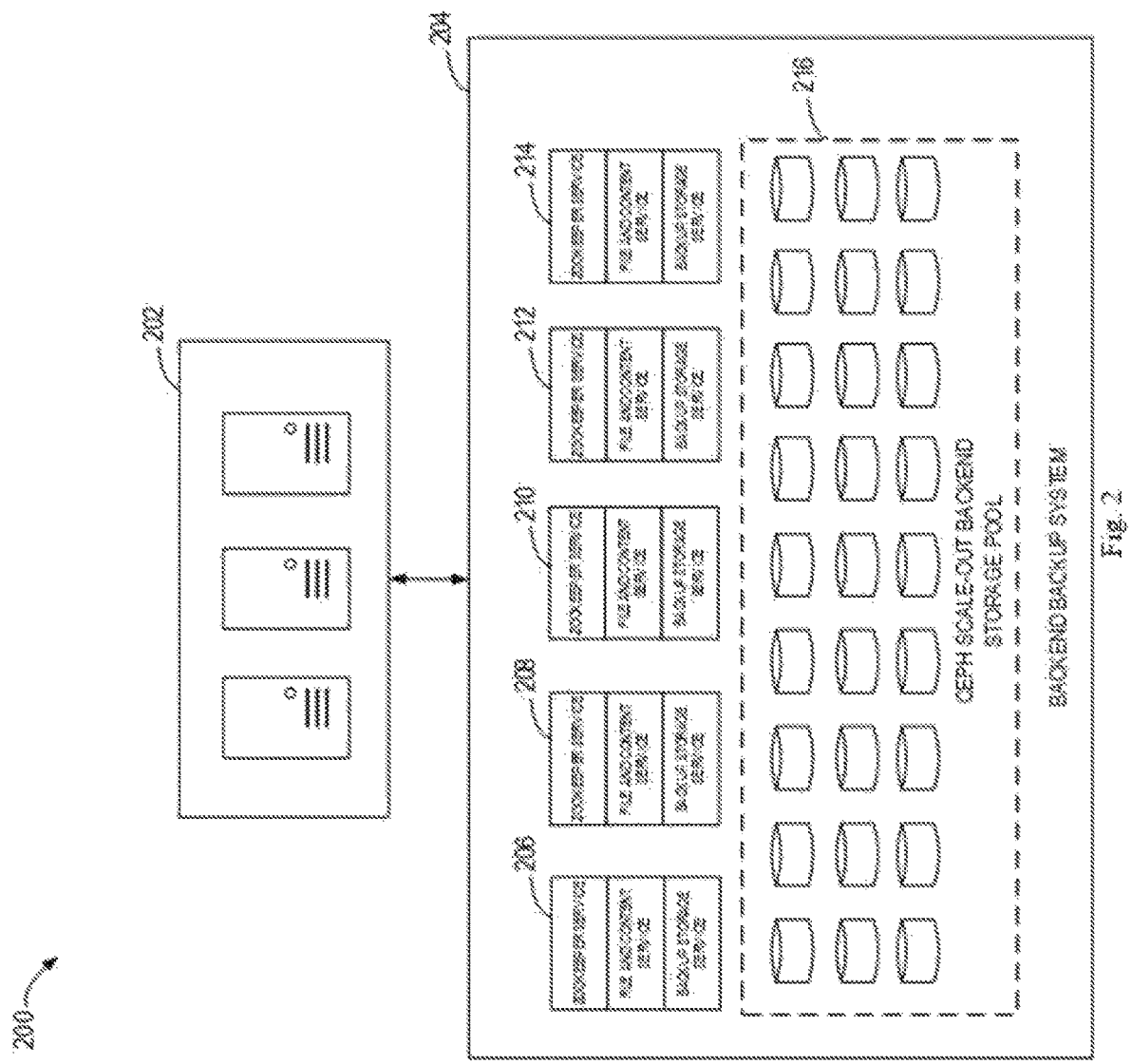
FIG. 2 illustrates a schematic diagram of a scale-out data backup architecture according to embodiments of the present disclosure.

The scale-out architecture according to embodiments of the present disclosure will be described with reference to FIG. 2. FIG. 2 illustrates a schematic diagram of a scale-out data backup architecture 200 according to embodiments of the present disclosure. As shown in FIG. 2, the architecture 200 includes a backup server 202 and a backend backup system 204. The backup server 202 may receive a data stream to be backed up from the user and send the data stream to be backed up to the backup system 204 via a network. In one embodiment, the backup server 202 may be arranged at the same physical position as the backend backup system 204. In a further embodiment, the backup server 202 may be arranged separately from the backup system 206.

In some embodiments, the data stream to be backed up is usually transmitted from the backup server 202 to the backup system 204 using Network File System (NFS), Common Internet File System (CIFS), Virtual Tape Library (VTL) protocol or DD-Boost. For example, the CIFS protocol may be used to transmit files in a Windows environment; the NFS protocol may be used to transmit files in a Linux or UNIX environment; and file transmission may be implemented by the VTL protocol in an SAN environment.

The backup system 204 may include a plurality of nodes 206, 208, 210, 212 and 214. In some embodiments, the plurality of nodes 206, 208, 210, 212 and 214 in the backup system 204 may be managed by ZooKeeper, which is an open source distributed application coordination service which may provide functionalities, such as cluster management, naming service, distributed configuration management, distributed message queue, distributed lock, distributed coordination and the like. The functions will not be described in detail here.

In some embodiments, a service (such as ZooKeeper service shown in FIG. 2) for communication among the plurality of nodes and management of the nodes may operate on the plurality of nodes 206, 208, 210, 212 and 214, such that the plurality of nodes may communicate with each other to elect a leader node. In some embodiments, ZooKeeper may guarantee data uniformity in the distributed cluster nodes based on the Zab protocol in the ZooKeeper. Besides, in some embodiments, the ZooKeeper may record IP addresses and port numbers of all the nodes in the leader node, and also may configure a monitoring interface on a client. Therefore, when a node is added into or removed from the ZooKeeper, the client may acquire a feedback, such that the client may be aware of the cluster status and may implement effective load balancing. In some embodiments, the client may also acquire, based on the ZooKeeper, node status, status of backup work and log information.

It should be noted that although the embodiments of the present disclosure is described in the context by taking ZooKeeper as an example, it is only exemplary and other suitable services, modules or procedures which are currently known or to be developed are also applicable.

In some embodiments, file and content service for processing deduplication, compression and the like and backup storage service for interacting with the backend storage also operate on each of the plurality of nodes 206, 208, 210, 212 and 214, as shown in FIG. 2.

In some embodiments, a backend storage pool 216 in the backend backup system 204 may also be implemented using a Ceph-based storage framework. Ceph (www.ceph.com) is an open source distributed storage and file system, which may provide a POSIX (Portable Operating System Interface)—compliant network file system with high performance, large data storage, and high compatibility. Besides, Ceph may also automatically implement automatic fault detection, automatic fault recovery and automatic rebalance. Those skilled in the art should understand that the backend storage pool 216 may also be implemented using other storage frameworks in support of scale-out.

In the process of implementing the Ceph scale-out backend storage pool 216, it is required that all object data are to be copied on a plurality of disks to create a replicated storage pool, which might be unacceptable for a capacity-sensitive backup storage. In some embodiments, Erasure Code can be employed for preventing recopying all data in the disks, thereby saving storage space.

Figure 3:
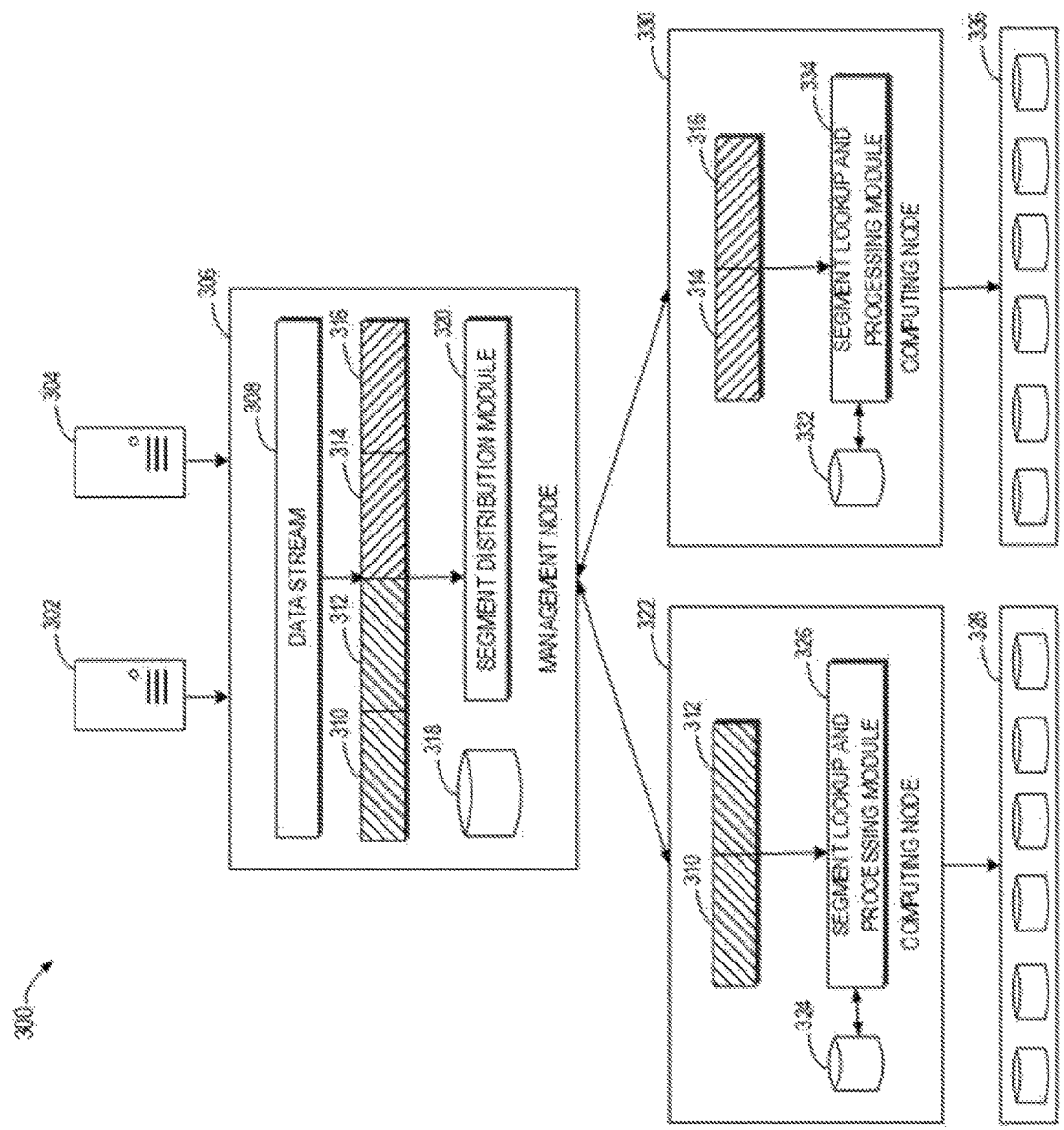
FIG. 3 illustrates a schematic diagram of a data backup system according to embodiments of the present disclosure.
Figure 4:
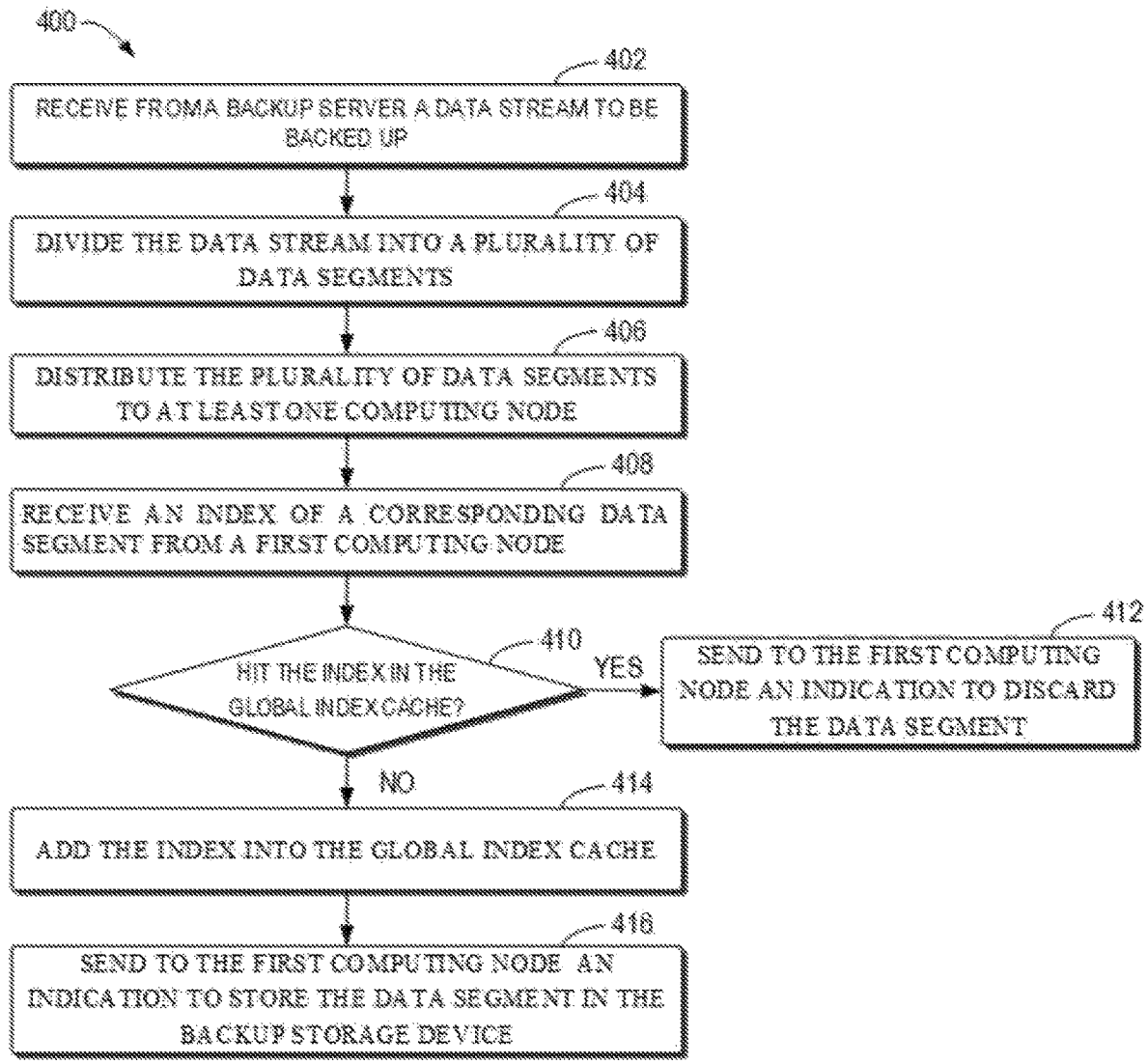
FIG. 4 illustrates a flowchart of a method of backing up data according to embodiments of the present disclosure.
Figure 5:
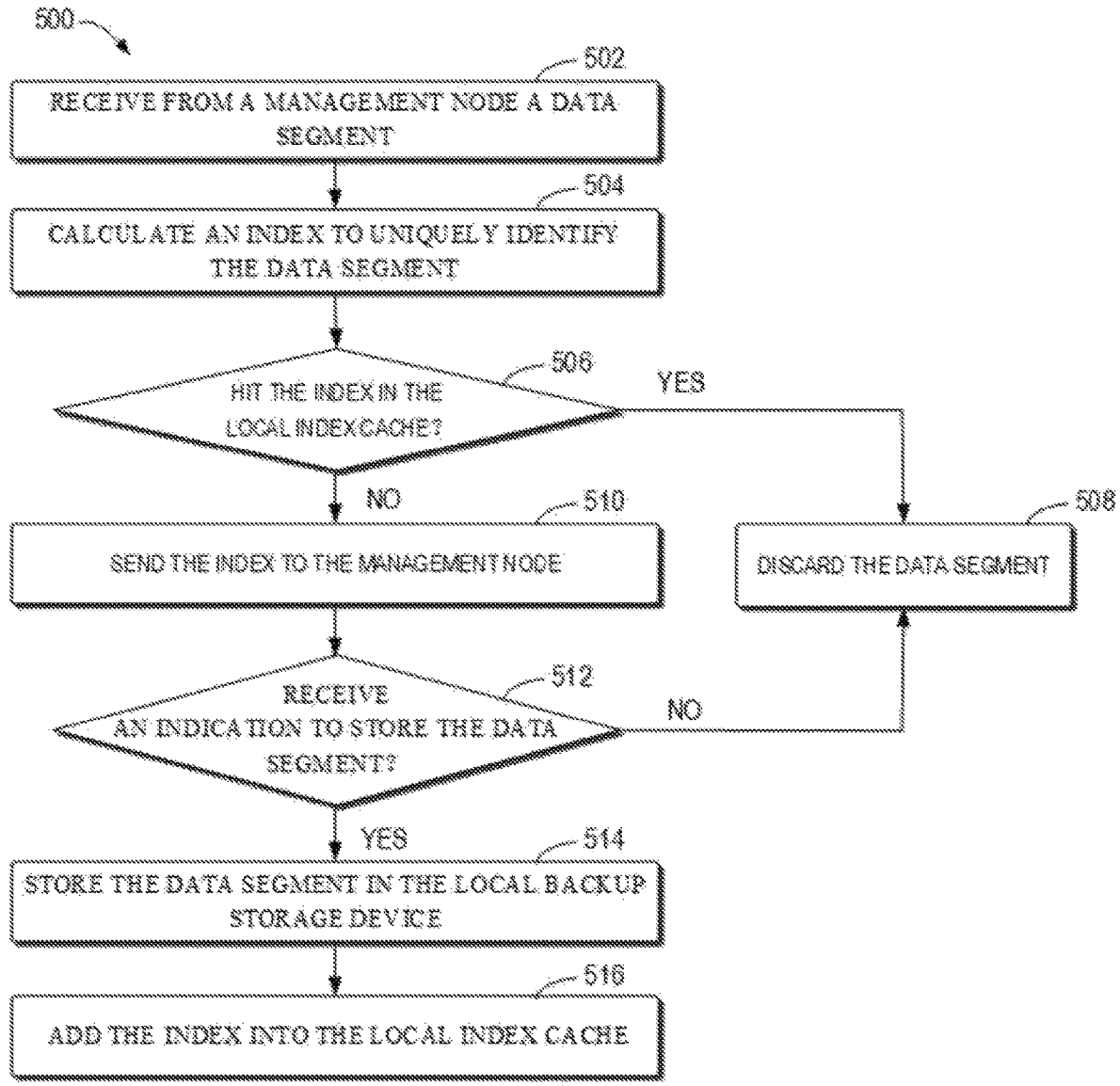
FIG. 5 illustrates a flowchart of a method of backing up data according to a further embodiment of the present disclosure.

The data backup architecture 200 according to embodiments of the present disclosure has been described above. Based on the architecture 200, a user may implement scale-out of the backup system with ease to satisfy the constantly growing requirements of data backup. A data backup process based on the data backup architecture 200 will be described with reference to FIGS. 3-5, wherein FIG. 3 illustrates a schematic diagram of a data backup system 300 according to embodiments of the present disclosure; FIG. 4 illustrates a flowchart of a method 400 of backing up data according to embodiments of the present disclosure; and FIG. 5 illustrates a flowchart of a method 500 of backing up data according to a further embodiment of the present disclosure.

As shown in FIG. 3, the data backup system 300 may include 2 backup servers 302 and 304. It should be appreciated that the two backup servers shown in FIG. 3 are only exemplary and the data backup system 300 may also include one or more backup servers. The backup servers may receive a data stream 308 to be backed up from the user, and send the data stream 308 to a management node 306.

The management node 306 may be elected from a plurality of nodes and may be connected to a computing node 322 and a computing node 330 to distribute, for example based on ZooKeeper, computational tasks (such as data deduplication task) to the computing node 322 and the computing node 330 for execution. It should be understood that the two computing nodes shown in FIG. 3 are only exemplary and the data backup system 300 may include one or more nodes. The computing node 322 and the computing node 330 are respectively provided with their own local backup storage 328 and 326. A data backup method based on the data backup system 300 shown in FIG. 3 will be described in details below with reference to FIGS. 4-5. FIG. 4 illustrates a method 400 of backing up data according to embodiments of the present disclosure. The method 400 may be performed by a management node.

At block 402, a management node receives from a backup server a data stream to be backed up. Specifically, the management node 306 receives the data stream 308 from the backup server 302 and the backup server 304, as shown in FIG. 3.

At block 404, the management node divides the data stream into a plurality of data segments. As shown in FIG. 3, the management node 306 may divide the data stream 308 into four data segments 310, 312, 314 and 326, wherein the data segments 310 and 312 are from the backup server 302 and the data segments 314 and 316 are from the backup server 304. In some embodiments, the management node may divide, based on different backup servers, the data stream into different data segments. In some further embodiments, the management node may also segment the data based on a fixed size of data segment.

At block 406, the management node distributes the plurality of data segments to at least one computing node. As shown in FIG. 3, the management 306 may distribute via a segment distribution module 320 a plurality of data segments 310, 312, 314 and 316 to the computing node 322 and the computing node 330. In some embodiments, in consideration of the principle of data proximity, which means data from the same backup server usually have a higher possibility of deduplication, the management node may pre-bind the backup server to a corresponding computing node, so as to distribute the data from a particular backup server to a binding computing node.

As shown in FIG. 3, the backup server 302 is binding to the computing node 322 and the backup server 304 is binding to the computing node 330. Therefore, data segments 310 and 312 from the backup server 302 will be distributed to the computing node 322, and data segments 314 and 316 from the backup server 304 will be distributed to the computing node 330. Based on such distribution mechanism, data proximity may be fully exploited to improve deduplication efficiency on the computing nodes.

In some embodiments, prior to distributing data segments from the backup servers to the corresponding computing nodes, it may also be determined that whether a status of the computing node is valid or not. If it is determined that the computing node is not recovered to be valid within a given period of time, data segments from the backup server may be distributed to a further valid backup server according to the principle of load balancing. Therefore, even when a particular computing node fails, the data segment may also be effectively distributed.

At block 408, the management node may receive an index of a corresponding data segment from a first computing node, wherein the index is generated by the first computing node to uniquely identify the data segment. For example, the management node 306 may receive an index of the data segment 312 from the computing node 322 and the management node 306 may also receive an index of the data segment 314 from the computing node 330, as shown in FIG. 3. In some embodiments, the index, for example, may be a hash value of the data segment.

At block 410, the management node looks up the index in a global index cache. For example, the management node 306 has a global index cache 318, which stores indexes of all data in all backup storage devices of the data backup system 300, as shown in FIG. 3. The global index cache 318 may be used to identify information of the backed-up data in the data backup system 300, such that the replicated data segments need not to be stored again, thereby saving the backup storage space.

If it is determined, at block 410, that the index is hit in the global index cache, the method 400 proceeds to block 412, i.e., sending to the first computing node an indication to discard the data segment. As shown in FIG. 3, if an index of the data segment 314 is hit in the global index cache 318, it indicates that the data segment 314 has already been stored in the backup storage device. Therefore, the management node 306 may send an indication to the computing node 330 to discard the data segment 314. In some embodiments, the computing node may also not send any indications to the computing node, and the computing node may automatically discard the data segment due to the absence of a corresponding indication.

If it is determined, at block 410, that the index is missed in the global index cache, the method 400 proceeds to block 414, i.e. the index is added into the global index cache. Besides, the management node sends to the first computing node an indication to store the data segment at block 406. As shown in FIG. 3, if an index of the data segment 312 is missed in the global index cache 318, it means that the data segment 312 is not stored in the backup storage device yet. Therefore, the management node 306 adds the index of the data segment 312 into the global index cache 318 for a next deduplication operation, indicating that the data segment 312 has been stored. At block 416, the management node sends to the computing node 322 an indication to store the data segment 314.

The data backup process according to embodiments of the present disclosure is described above from the side of management node. FIG. 5 illustrates a method 500 of backing up data according to embodiments of the present disclosure. The method 500 can be performed by a computing node.

At block 502, a computing node receives a data segment from the management node. For example, the computing node 322 receives data segments 310 and 312 from the management node 306 and the computing node 330 receives data segments 314 and 316 from the management node 306, as shown in FIG. 3.

At block 504, the computing node calculates an index to uniquely identify the data segment. As shown in FIG. 3, the computing node 322 will calculate indexes of the data segments 310 and 312 and the computing node 330 will calculate indexes of the data segments 314 and 316. In some embodiments, the index may be a value of a hash function on the data segment and may uniquely identify the data segment. Meanwhile, the index may be used to rapidly determine whether the data segment has been stored or not without traversing data in all storage devices.

At block 506, the computing node looks up the index in a local index cache. For example, the computing nodes 322 and 330 may respectively have segment lookup and processing modules 326 and 334 and local index caches 324 and 332, as shown in FIG. 3. The segment lookup and processing modules 326 and 334 may look up index in the local index caches 324 and 332, which respectively store indexes of data in the local backup storage devices 328 and 336 associated with the computing node. For example, the local index cache 324 may identify information of the backed-up data in the local backup storage device 328, such that data segments repeated with data in the backup storage device 328 are no longer stored, thereby saving the backup storage space.

If it is determined, at block 506, that the index is hit in the local index cache, the method 500 proceeds to the block 508, which means that the data segment has been stored already and the data segment is discarded accordingly. As shown in FIG. 3, for example, if an index of the data segment 310 is hit in the local index cache 324, it means that the data segment 310 has been stored in the local backup storage device 328 and the data segment 310 may be discarded accordingly. Similarly, if an index of the data segment 316 is hit in the local index cache 332, it means that the data segment 316 has been stored in the local backup storage device 336 and the data segment 316 may be discarded accordingly.

If it is determined, at block 506, that the index is missed in local index cache, the method 500 proceeds to block 510, which means that the data segment is not stored in the local backup storage device. Therefore, it is required that the index is sent to the management node to determine whether the data segment has been stored in other backup storage devices. For example, the index of the data segment 312 and the index of the data segment 314 may be sent to the management node 306.

At block 512, the computing node determines whether an indication to store the data segment is received or not. Specifically, the computing node may monitor a port in communication with the management node to determine whether an indication to store the data segment is received. In some embodiments, the computing node may also determine whether an indication is received within a predetermined period of time.

If it is determined that the computing node fails to receive from the management node an indication to store the data segment at block 512, the method 500 proceeds to block 508, i.e., discarding the data segment. Specifically, the computing node may discard the data segment based on that an indication to store the data segment is not received within a predetermined period of time or an indication to discard the data segment is received. This identifies that the management node has already determined that the data segment is stored in other backup storage devices, and the data segment may be discarded accordingly. For example, the computing node 300 may receive from the management node 306 an indication to discard the data segment 314, and the computing node 330 may discard the data segment 314 in response to the indication, as shown in FIG. 3.

If it is determined, at block 512, that the computing node receives from the management node an indication to store the data segment, the method 500 proceeds to block 514, i.e., storing the data segment in a local backup storage device. Besides, the index is added into the local index cache at block 516. Specifically, the computing node 332 receives from the management node 306 an indication to store the data segment 312 in FIG. 3, and stores the data segment 312 in the local backup storage device 328. Then, an index of the data segment 312 is added into the local index cache 324 to implement backup storage of the data segment 312.

The process of data backup according to embodiments of the present disclosure is described above with reference to FIGS. 3-5. The present disclosure proposes a double deduplication mechanism, i.e., distributing deduplication tasks to each computing node first and then performing a second deduplication at the management node. Based on this mechanism, the backup system may evenly distribute the computational tasks to a plurality of computing nodes, to avoid affecting the backup performance due to overloaded task of a single computing node. Further, the backup system may also perform a second deduplication at the management node to ensure that the data segment will not be repeatedly stored, to save storage space in the backup storage device.

Moreover, a user may easily add the computing node and the corresponding backup storage device into the backup system based on the scale-out architecture, to cope with the increasing requirements of backup data of the user.

Figure 6:
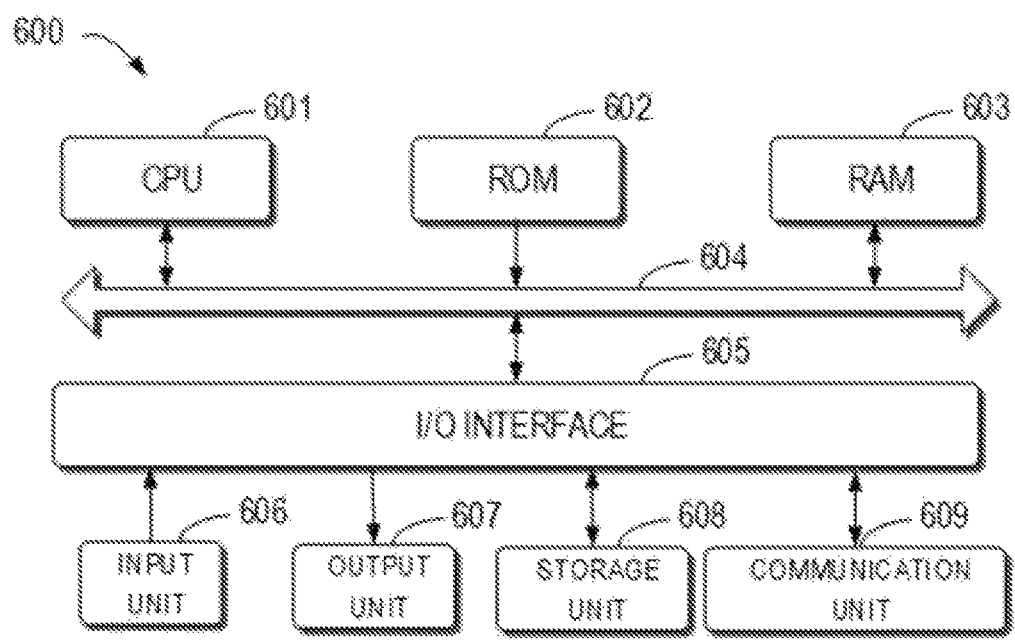
FIG. 6 illustrates a schematic block diagram of an example device for implementing embodiments of the present disclosure.

FIG. 6 is a schematic block diagram of an example apparatus that can be used to implement embodiments of the present disclosure. For example, the backup servers, management nodes and computing nodes in FIG. 3 may be implemented by the apparatus 600.

As shown in FIG. 6, the apparatus 600 comprises a central processing unit (CPU) 601 which is capable of performing various processes in accordance with computer program instructions stored in a read only memory (ROM) 602 or computer program instructions loaded from a storage unit 608 to a random access memory (RAM) 603. In the RAM 603 are stored various programs and data as required by operation of the apparatus 600. The CPU 601, the ROM 602 and the RAM 603 are connected to one another via a bus 604. An input/output (I/O) interface 606 is also connected to the bus 604.

The following components in the device 600 are connected to the I/O interface 605: an input unit 606 including a keyboard, a mouse, or the like; an output unit 607 such as various types of displays and speakers; the storage unit 608 such as a magnetic disk or optical disk; and a communication unit 609 such as a network card, a modem, a wireless communication transceiver or the like. The communication unit 609 allows the device 600 to exchange information/data with other devices through a computer network such as the Internet and/or various types of telecommunication networks.

The processing unit 601 performs various method and processes described above, for example method 400 and/or method 500. For example, in some embodiments, the method 400 and/or method 500 may be implemented as a computer software program or computer program product, which is tangibly contained in a machine-readable medium, for example the storage unit 608. In some embodiments, part or all of the computer program may be loaded and/or installed on the device 600 via ROM 602 and/or communication unit 609. When the computer program is loaded in the RAM 603 and executed by CPU 601, one or more acts of the method 400 and/or method 500 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means for implementing the functions/actions specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of backing up data, comprising:
   in response to receiving from a backup server a data stream to be backed up, dividing, by a management node, the data stream into a plurality of data segments;
   distributing, by the management node, the plurality of data segments to at least one computing node, the management node being different from each computing node,
   wherein distributing the plurality of data segments to the at least one computing node comprises:
      increasing a probability of deduplication of the plurality of data segments based on a pre-binding of the backup server to a first computing node from among the at least one computing node;
      determining, from the at least one computing node, the pre-binding of the backup server to the first computing node; and
      distributing the plurality of data segments to the first computing node,
   wherein in response to distributing the plurality of data segments to the first computing node, a primary deduplication task is performed by the first computing node, and
   wherein during performance of the primary deduplication task by the first computing node, a hash uniquely identifying a respective data segment from among the plurality of data segments is calculated, the hash is looked up in a local hash cache of the first computing node, and in response to the hash being missed in the local hash cache, the hash is sent to the management node;
   in response to receiving the hash of the respective data segment at the management node from the first computing node, performing a secondary deduplication task by the management node, the secondary deduplication task performed by the management node comprising:
      looking up the hash in a global hash cache of the management node, the global hash cache storing hashes of data in a backup storage device,
   wherein looking up the hash includes accessing the global hash cache from the management node; and
   in response to missing the hash in the global hash cache of the management node, adding the hash into the global hash cache, and sending to the first computing node an indication to store the respective data segment in the backup storage device.

2. The method of claim 1, further comprising:
   in response to (1) receiving, at the management node from a second computing node from among the at least one computing node, a hash of another data segment from among the plurality of data segments and (2) hitting the hash received from the second computing node in the global hash cache, sending, by the management node to the second computing node, an indication to discard the other data segment.

3. The method of claim 1, wherein distributing the plurality of data segments to the at least one computing node further comprises:
   determining validity of the first computing node; and
   in response to the first computing node being valid, sending the plurality of data segments to the first computing node.

4. The method of claim 1, further comprising:
   in response to receiving a second hash of a second data segment from a second computing node from among the at least one computing node, looking up the second hash in the global hash cache of the management node, the second hash uniquely identifying the second data segment being generated by the second computing node;
   in response to missing the second hash in the global hash cache of the management node, adding the second hash into the global hash cache, and sending to the second computing node a second indication to store the second data segment in the backup storage device.

5. The method of claim 4, further comprising:
   in response to receiving a third hash of a third data segment from the first computing node, looking up the third hash in the global hash cache of the management node, the third hash uniquely identifying the third data segment being generated by the first computing node;

in response to hitting the third hash in the global hash cache of the management node, avoiding adding the third hash into the global hash cache; and sending to the first computing node a third indication to discard the third data segment.

6. The method of claim 1 wherein each of the backup server, the management node, the first computing node, and the backup storage device is included in a scale-out data backup architecture, and the method further comprises:

adding, to the scale-out data backup architecture, a second computing node from among the at least one computing node and a second backup storage device.

7. The method of claim 6 wherein in response to distributing the plurality of data segments to at least one computing node, a second primary deduplication task is performed by the second computing node, and wherein during performance of the second primary deduplication task by the second computing node, a second hash uniquely identifying a second data segment from among the plurality of data segments is calculated, the second hash is looked up in a second local hash cache of the second computing node, and in response to the second hash being missed in the second local hash cache, the second hash is sent to the management node.

8. The method of claim 7 further comprising:

in response to receiving the second hash of the second data segment at the management node from the second computing node, performing a second secondary deduplication task by the management node, the second secondary deduplication task performed by the management node comprising:

looking up the second hash in the global hash cache of the management node; and in response to missing the second hash in the global hash cache of the management node, adding the second hash into the global hash cache, and sending to the second computing node an indication to store the second data segment in the second backup storage device.

9. A method of backing up data, comprising:

in response to receiving, from a management node at a first computing node from among at least one computing node, a data segment from a data stream, performing a primary deduplication task by the first computing node, the data stream being received at the management node from a backup server, a probability of deduplication of the plurality of data segments being increased based on a pre-binding of the backup server to the first computing node, the pre-binding being determined by the management node of the backup server to the first computing node, the plurality of data segments being distributed to the first computing node, the primary deduplication task being performed by the first computing node in response to the plurality of data segments being distributed to the first computing node, and the primary deduplication task performed by the first computing node comprising:

calculating a hash uniquely identifying the data segment;

looking up the hash in a local hash cache of the first computing node, the local hash cache storing hashes of data in a local backup storage device; and in response to missing the hash in the local hash cache, sending the hash to the management node, wherein in response to the hash of the data segment being received at the management node from the first computing node, a secondary deduplication task is performed by the management node, and wherein during performance of the secondary deduplication task by the management node, the hash is looked up in a global hash cache of the management node, hashes of data in the backup storage device being stored in the global hash cache, and in response to the hash being missed in the global hash cache of the management node, the hash is added into the global hash cache, and an indication to store the data segment in the backup storage device is sent to the first computing node;

in response to receiving, at the first computing node from the management node, the indication to store the data segment, storing, by the first computing node, the data segment in the local backup storage device; and adding the hash into the local hash cache of the first computing node.

10. The method of claim 9, further comprising:

in response to receiving another data segment at the first computing node from the management node, calculating, by the first computing node, another hash uniquely identifying the other data segment;

looking up, by the first computing node, the other hash in the local hash cache;

in response to missing the other hash in the local hash cache, sending, by the first computing node, the other hash to the management node; and in response to failing to receive, at the first computing node from the management node, an indication to store the other data segment within a predetermined period of time after sending the other hash to the management node, discarding, by the first computing node, the other data segment.

11. A device for backing up data, comprising:

at least one processing unit;

at least one memory coupled to the at least one processing unit and storing instructions executed by the at least one processing unit, the instructions, when executed by the at least one processing unit, causing the device to perform acts comprising:

in response to receiving from a backup server a data stream to be backed up, dividing the data stream into a plurality of data segments;

distributing the plurality of data segments to at least one computing node that is different from the device for backing up data, wherein distributing the plurality of data segments to the at least one computing node comprises;

increasing a probability of deduplication of the plurality of data segments based on a pre-binding of the backup server to a first computing node from among the at least one computing node;

determining, from the at least one computing node, the pre-binding of the backup server to the first computing node; and distributing the plurality of data segments to the first computing node, wherein in response to distributing the plurality of data segments to the first computing node, a primary deduplication task is performed by the first computing node, and wherein during performance of the primary deduplication task by the first computing node, a hash uniquely identifying a respective data segment from among the plurality of data segments is calculated, the hash is looked up in a local hash cache of the first computing node, and in response to the hash being missed in the local hash cache, the hash is sent to the device;

in response to receiving the hash of the respective data segment from the first computing node, performing a secondary deduplication task comprising:

looking up the hash in a global hash cache, the global hash cache storing hashes of data in a backup storage device; and in response to missing the hash in the global hash cache, adding the hash into the global hash cache, and sending to the first computing node an indication to store the respective data segment in the backup storage device.

12. The device of claim 11, wherein the acts further comprise:

in response to hitting the hash in the global hash cache, sending to the first computing node an indication to discard the respective data segment.

13. The device of claim 11, wherein distributing the respective data segment to the computing node further comprises:

determining validity of the first computing node; and in response to the first computing node being valid, sending the plurality of data segments to the first computing node.

14. A device for backing up data, comprising:

at least one processing unit;

at least one memory coupled to the at least one processing unit and storing instructions executed by the at least one processing unit, the instructions, when executed by the at least one processing unit, causing the device to perform acts comprising:

in response to receiving, from a management node, a data segment from a data stream, performing a primary deduplication task, the data stream being received at the management node from a backup server, a probability of deduplication of the plurality of data segments being increased based on a pre-binding of the backup server to the device, the pre-binding of the backup server to the device being determined by the management node, the plurality of data segments being distributed to the device, the primary deduplication task being performed by the device in response to the plurality of data segments being distributed to the device, and the primary deduplication task comprising:

calculating a hash uniquely identifying the data segment;

looking up the hash in a local hash cache storing hashes of data in a local backup storage device; and in response to the missing hash in the local hash cache, sending the hash to the management node, wherein in response to the hash of the data segment being received at the management node from the device, a secondary deduplication task is performed by the management node, and wherein during performance of the secondary deduplication task by the management node, the hash is looked up in a global hash cache of the management node, hashes of data in the backup storage device being stored in the global hash cache, in response to the hash being missed in the global hash cache of the management node, the hash is added into the global hash cache, and an indication to store the data segment in the backup storage device is sent to the device;

in response to receiving from the management node the indication to store the data segment, storing the data segment in the local backup storage device; and adding the hash into the local hash cache.

15. The device of claim 14, wherein the acts further comprise:

in response to failing to receive from the management node the indication to store the data segment within a predetermined period of time, discarding the data segment.

* * * * *